Aug. 7, 1928.
C. H. ROTH
1,679,545
TUBE MILL
Filed May 23, 1925
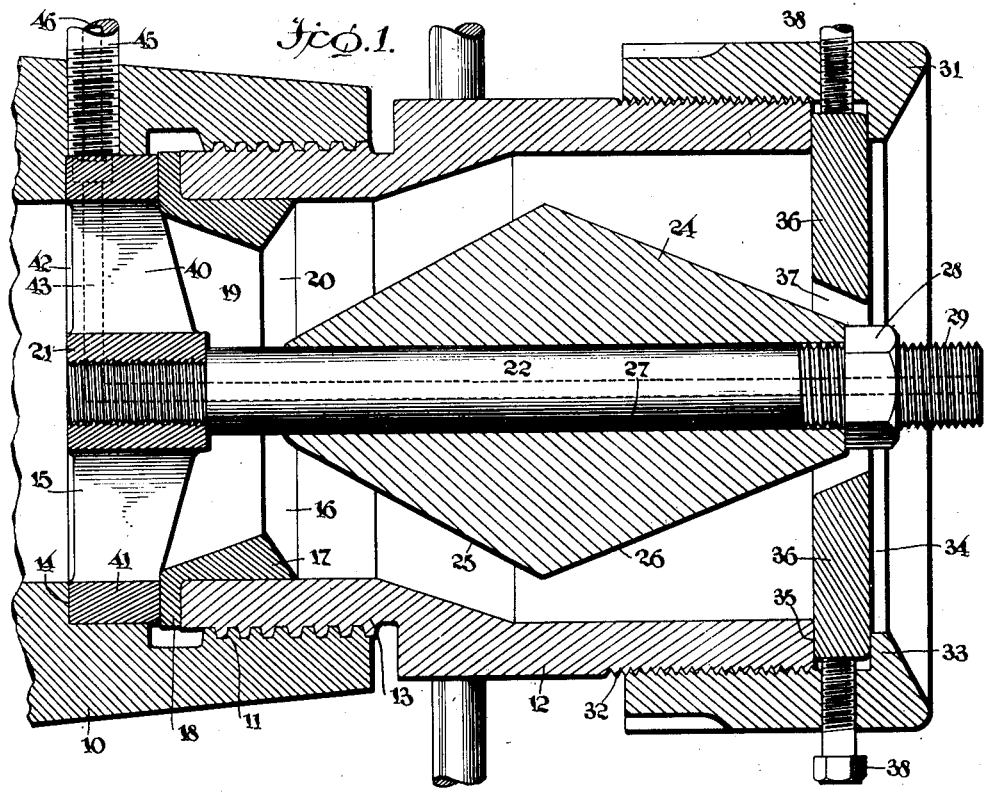
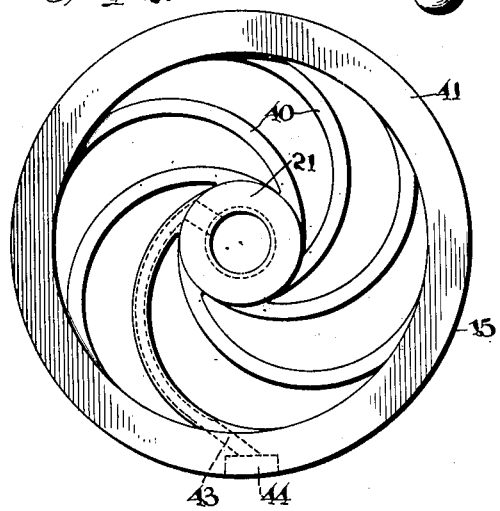
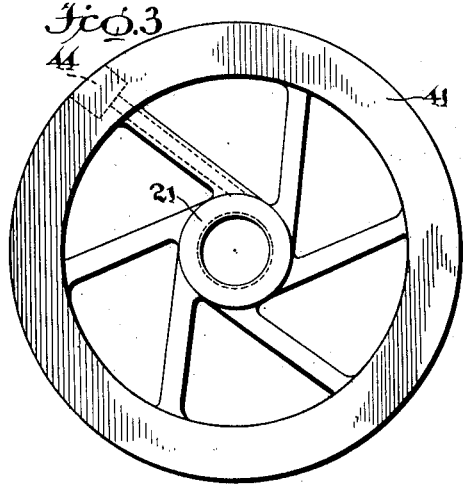
INVENTOR
Charles H. Roth,
BY
ATTORNEY Patented Aug. 7, 1928.

1,679,545

UNITED STATES PATENT OFFICE.

CHARLES H. ROTH, OF AKRON, OHIO, ASSIGNOR TO THE GOODYEAR TIRE & RUBBER COMPANY, OF AKRON, OHIO, A CORPORATION OF OHIO.

TUBE MILL.

Application filed May 23, 1925. Serial No. 32,435.

My invention relates to tube mills and particularly to that class of mills which are adapted to extrude plastic material in the form of a seamless tube.

It is an object of my invention to improve mills of this character to obtain a more satisfactory product than was attainable heretofore.

Plastic material, which is to be made into a seamless tube, is usually worked through a worm mechanism against a suitable die, through which it is extruded. Machines of this character are well-known in the art. When working with material such as unvulcanized rubber, difficulty has been experienced in obtaining a tube which is uniform in the thickness of its wall. The purpose of this invention is to so improve such machines that a tube with walls of uniform strength and thickness may be obtained.

In the drawings, which show one manner in which the invention may be practiced:

Fig. 1 is a longitudinal section of the discharge end of a tube mill;

Fig. 2 represents a detail in elevation of an element of the machine; and

Fig. 3 is a view of a similar element somewhat modified.

Referring more particularly to the drawings, 10 indicates the discharge end of a tube mill of any desired construction. Screwthreads 11 are turned in the inner face of the discharge end. A head 12, having a reduced portion 13, on which are turned screwthreads, is adapted to fit into the discharge end 10 of the mill. In the space between the inner end of the head 12 and an annular shoulder 14 of the discharge end 10, are a spider 15 and an annular plate 16. The plate 16 has a reduced portion 17 which fits within the head 12, a flanged portion 18 thereof abutting against the spider 15. Shims may be inserted to space the plate from the head. The aperture of the plate is made with inwardly sloping conical faces 19, 20.

Mounted in the hub 21 of the spider 15 is a rod 22, having a bore 23 extending practically through its entire length. The rod is threaded in order to secure it to the hub of the spider. A core 24, made of a single piece of metal, having opposed conical faces 25 and 26, and an annular bore 27, is mounted on the rod 22. The core 24 is secured within the head 12 on the rod 22 by means of a nut 28, mounted on the threaded outer end 29 of the rod 22.

A cap 31 is threaded on the outer end of the head 12, indicated at 32. The cap has an inner flange 33 and an annular bore 34. Spaced between the outer face 35 of the head 12 and the flange 33 of the cap 31 is a series of dies 36. The dies extend inwardly until they nearly meet the outer portion of the core 24. An aperture 37 formed between the dies and the core, and through which the tubing passes, is adjustable by means of screws 38 extending through the cap 31 and abutting against the dies.

The spider 15 has spokes 40, which are disposed in non-radial relation to the hub 21 and the rim 41. These spokes may be curved, as shown in Fig. 2, or they may be tangential, as indicated in Fig. 3, or they may be disposed in any relation so long as they are not radial. The spokes 40 are bevelled on one face, as shown at 42. The other face of the spokes slopes outwardly to the hub portion 21 to strengthen the spider. One spoke is provided with a bore 43, extending from the outer rim portion through the hub to the orifice 23 of the rod 22. The bore is countersunk at 44 in order to admit a screw 45 which will secure the spider in position. The screw 45 is also provided with a bore 46 in registry with the bore of the spider. The outer end of the screw is threaded in order to admit a pipe line. It will be seen that by this construction a continuous passageway is provided from a point outside of the machine through the spider and the supporting rod into the tubing which is to be extruded through the die.

While no particular difficulty would be experienced in drilling a hole through a straight spoke, this is not so when the spoke is curved, as shown in Fig. 2. To obtain a bore through the curved spoke spider, one spoke is cut away after the spider is cast. A straight piece of hollow tubing of suitable size is then bent into shape and inserted in place of the removed spoke. The hub and rim are chipped out in order to admit the end portions of the hollow spoke. After the tube is in proper position, metal is welded around the joints in order to provide a rigid structure. The bore may then be prolonged by drilling with ordinary tools.

The operation of the device is as follows. Plastic material, such as rubber, forced by the worm against the spider, passes through the spokes of the spider, through the conical aperture of the annular plate, around the core, and emerges through the dies in the form of a tube. As the tube is extruded, suitable material such as soapstone, is pumped through the bore extending through the spider and the rod into the interior of the tube. This material prevents the internal walls of the tube from sticking in case the tube should collapse.

The effect of the churning and kneading action imposed on the plastic material to form a good tubing, is destroyed to a large extent if a radially spoked spider be employed. The exact reason for this is not clearly understood, but it has been observed that, if a radially spoked spider be used, the walls of the tube will not be uniform in thickness and "drift marks" will appear in the walls. "Drift marks" are lines extending through the walls of the tube. They indicate points of weakness.

By using a spider with non-radial spokes, particularly one having curved spokes, it is found that drift marks are eliminated, and that the tube is uniform in diameter. The conical faces on the annular plate also assist in obtaining a better product. The discovery of means which correct the disadvantages of older types of machines constitutes the basis of the invention.

While the invention is described in particular connection with rubber, it is understood that it is not so limited, but that it may be applied to extrusion machines operating on a variety of plastic materials. The invention should be limited only by the scope of the following claims.

What I claim is:

1. In a tubing machine, a spider comprising a hub and a rim, and a series of arcuate spokes connecting the hub and rim.

2. An annular member having longitudinally curved spokes and a bore extending entirely through the length of one of the spokes.

3. A spider comprising a hub and a rim, spokes connecting the hub and the rim, and disposed in longitudinally curved relation thereto, and a bore extending from the rim to the hub through one of the spokes.

4. In a tubing machine, a spider comprising a hub and a rim, a series of arcuate spokes connecting the hub and rim and a bore extending from the rim to the hub through one of the spokes.

5. A tube machine comprising a die, means for forcing plastic material through said die, an apertured mandrel, and means for holding said mandrel within said die, said mandrel holding means comprising a spider having a hub portion constituting a support for the mandrel and a web portion extending circuitously from said hub portion to a position radially remote therefrom, said web portion being formed with a circuitous conduit extending from said position to said hub portion and communicating with the aperture in said mandrel.

In witness whereof, I have hereunto signed my name.

CHARLES H. ROTH.